US008867785B2

(12) United States Patent
Bamidele et al.

(10) Patent No.: US 8,867,785 B2
(45) Date of Patent: Oct. 21, 2014

(54) METHOD AND APPARATUS FOR DETECTING PROXIMATE INTERFACE ELEMENTS

(75) Inventors: Adetokunbo Bamidele, Dublin, CA (US); Kenneth Walker, Concord, CA (US); Gabriel Nava-Vazquez, Campbell, CA (US)

(73) Assignee: Nokia Corporation, Espoo (FI)

( * ) Notice: Subject to any disclaimer, the term of this patent is extended or adjusted under 35 U.S.C. 154(b) by 215 days.

(21) Appl. No.: 13/571,980

(22) Filed: Aug. 10, 2012

(65) Prior Publication Data

US 2014/0044306 A1    Feb. 13, 2014

(51) Int. Cl.
*G06K 9/62*    (2006.01)

(52) U.S. Cl.
USPC .......................................... 382/103

(58) Field of Classification Search
None
See application file for complete search history.

(56) References Cited

U.S. PATENT DOCUMENTS

| 6,401,034 | B1 * | 6/2002 | Kaplan et al. ................. 701/416 |
| 2001/0024200 | A1 * | 9/2001 | Gupta et al. .................. 345/418 |
| 2002/0130906 | A1 | 9/2002 | Miyaki |
| 2008/0268876 | A1 * | 10/2008 | Gelfand et al. ............... 455/457 |
| 2009/0110302 | A1 | 4/2009 | Snow |
| 2011/0161875 | A1 * | 6/2011 | Kankainen .................... 715/810 |
| 2012/0194547 | A1 * | 8/2012 | Johnson et al. ............... 345/632 |

FOREIGN PATENT DOCUMENTS

| EP | 2306151 A1 * | 4/2011 |
| EP | 2393056 A1 * | 12/2011 |

* cited by examiner

*Primary Examiner* — Stephen R Koziol
*Assistant Examiner* — Delomia Gilliard
(74) *Attorney, Agent, or Firm* — Alston & Bird LLP

(57) ABSTRACT

A method, apparatus and computer program product are therefore provided in order to provide an efficient, aesthetically pleasing display of points of interest in an AR interface that maximizes usability and display efficiency. In this regard, the method, apparatus and computer program product may utilize a mobile terminal to perform pre-processing of interface elements to reduce display clutter and increase efficiency of display processing. Interface elements may be projected onto a cylindrical surface to locate the interface elements relative to the mobile terminal. Interface elements may be analyzed in the projection to identify interface elements that are proximate to one another. Data indicating that particular interface elements are proximate to one another may be stored in a data structure for reference prior to displaying of the interface elements in an AR interface.

20 Claims, 5 Drawing Sheets

METHOD AND APPARATUS FOR DETECTING PROXIMATE INTERFACE ELEMENTS

TECHNOLOGICAL FIELD

An example embodiment of the present invention relates generally to augmented reality displays and, more particularly, to displaying location-based points of interest via an augmented reality display.

BACKGROUND

Advances in technology have allowed for increasingly complex features to be integrated into mobile terminals. Features such as video cameras, location information systems, compasses, gyroscopes, and accelerometers are capable of leveraging the communication capabilities of mobile terminals such as cellular phones, personal digital assistants (PDAs), and smartphones to provide users with unprecedented levels of information. One such way of providing information to a user is via the use of an augmented reality (AR) display. Such displays typically receive and display image data from an image capture device or a video capture device (e.g., a video camera coupled to the mobile terminal) and modify or overlay the image data to impart additional information to the user. For example, an AR display might use compass readings, an internal gyroscope, and an image of a night sky to overlay the night sky with the names of particular constellations. Another AR display might overlay a user's travel route to a destination over a view of a city street to direct the user.

One use of AR displays provides information about nearby points of interest (POIs) to a user by overlaying icons representing the points of interest on a video display of the environment. These points of interest are typically displayed on the screen as graphical objects projected by a processor. Efficient display of these points of interest requires careful placement of objects to minimize screen clutter while still presenting the graphical objects in an intuitive manner that allows for ease of interaction.

BRIEF SUMMARY

A method, apparatus and computer program product are therefore provided according to an example embodiment of the present invention in order to provide an efficient, aesthetically pleasing display of points of interest in an AR interface that maximizes usability and display efficiency. In this regard, the method, apparatus and computer program product of an example embodiment may utilize a mobile terminal to perform pre-processing of interface elements to reduce display clutter and increase efficiency of display processing. Interface elements may be projected onto a cylindrical surface to locate the interface elements relative to the mobile terminal. Interface elements may be analyzed in the projection to identify interface elements that are proximate to one another. Data indicating that particular interface elements are proximate to one another may be stored in a data structure for reference prior to rendering of the interface elements. In this manner, interface elements may be clustered and/or deoverlapped prior to rendering on a three dimensional display, thus improving the user visual experience while not significantly adding to processing workload.

Example embodiments of the invention may provide a method. The method may include projecting, using a processor, a plurality of points of interest onto a cylinder using at least a bearing angle for each point of interest, determining an angular width of each of a plurality of interface elements, each of the plurality of interface elements associated with at least one of the points of interest, identifying at least one horizontal overlap between at least two of the plurality of interface elements using the angular width of the interface elements and the bearing angle associated with the points of interest corresponding to the at least two interface elements, in response to identifying the at least one horizontal overlap, storing data in a neighbor list, the data indicating that the points of interest corresponding to the at least two interface elements are neighbors, and modifying, based on the neighbor list, a display of a subset of the plurality of points of interest. The subset of the plurality of points of interest may include at least one of the points of interest corresponding to the at least two interface elements. The display may be modified by deoverlapping the at least two interface elements. The display may be modified by clustering the at least two interface elements into a single interface element. The method may also include determining an angular height of each of the plurality of interface elements, identifying at least one vertical overlap between the at least two of the plurality of interface elements using the angular height of the interface elements and the bearing associated with the points of interest corresponding to the at least two interface elements, and only storing the data in the neighbor list in response to identifying both the horizontal overlap and the vertical overlap. The method may also include sorting the plurality of points of interest based on the bearing of each point of interest relative to north, and identifying the at least two of the plurality of the interface elements based on the sorting of the plurality of points of interest. The method may further include determining whether a horizontal overlap exists for interface elements corresponding to each of the plurality of points of interest, and storing data indicating each of the horizontal overlaps in the neighbor list. The method may also include using the neighbor list to identify a subset of points of interest to analyze for overlapping interface elements. The method may further include determining a first location, receiving at least one second location, determining the bearing angle using the first location and the second location. The first location may correspond to the location of a mobile terminal. The at least one second location may correspond to the location of at least one of the points of interest.

Example embodiments of the invention may further provide an apparatus comprising at least one processor and at least one memory including computer program instructions. The at least one memory and the computer program may include instructions configured to, with the at least one processor, cause the apparatus at least to project a plurality of points of interest onto a cylinder using at least a bearing angle for each point of interest, determine an angular width of each of a plurality of interface elements, identify at least one horizontal overlap between at least two of the plurality of interface elements using the angular width of the interface elements and the bearing angle associated with the points of interest corresponding to the at least two interface elements, in response to identifying the at least one horizontal overlap, store data in a neighbor list, and modify, based on the neighbor list, a display of a subset of the plurality of points of interest, where the subset of the plurality of points of interest includes at least one of the points of interest corresponding to the at least two interface elements. Each of the plurality of interface elements may be associated with at least one of the points of interest. The data may indicate that the points of interest corresponding to the at least two interface elements are neighbors. The display may be modified by deoverlapping the at least two interface elements. The display may be modified by clustering the at least two interface elements into a single interface element. The apparatus may be further configured to determine an angular height of each of the plurality of interface elements, identify at least one vertical overlap between the at least two of the plurality of interface elements using the angular height of the interface elements and the bearing associated with the points of interest corresponding to the at least two interface elements, and store the data in the neighbor list in response to identifying both the horizontal overlap and the vertical overlap. In some embodiments the apparatus may be further configured to sort the plurality of points of interest based on the bearing of each point of interest relative to north, and identify the at least two of the plurality of the interface elements based on the sorting of the plurality of points of interest. The apparatus may also be configured to determine whether a horizontal overlap exists for interface elements corresponding to each of the plurality of points of interest, and store data indicating each of the horizontal overlaps in the neighbor list. The apparatus may be further configured to use the neighbor list to identify a subset of points of interest to analyze for overlapping interface elements. In some embodiments the apparatus may be configured to determine a heading of the apparatus, and determine, using the heading, whether the point of interest is visible in a display of the apparatus prior to displaying the point of interest.

Example embodiments of the invention may further provide a computer program product comprising at least one non-transitory computer-readable storage medium bearing computer program instructions embodied therein for use with a computer. The computer program instructions may include program instructions configured to project a plurality of points of interest onto a cylinder using at least a bearing angle for each point of interest, determine an angular width of each of a plurality of interface elements, identify at least one horizontal overlap between at least two of the plurality of interface elements using the angular width of the interface elements and the bearing angle associated with the points of interest corresponding to the at least two interface elements, in response to identifying the at least one horizontal overlap, store data in a neighbor list, the data indicating that the points of interest corresponding to the at least two interface elements are neighbors, and modify, based on the neighbor list, a display of a subset of the plurality of points of interest. The subset of the plurality of points of interest may include at least one of the points of interest corresponding to the at least two interface elements. Each of the plurality of interface elements may be associated with at least one of the points of interest. The display may be modified by deoverlapping the at least two interface elements. The display may be modified by clustering the at least two interface elements into a single interface element. The computer program product may be further configured to determine an angular height of each of the plurality of interface elements, identify at least one vertical overlap between the at least two of the plurality of interface elements using the angular height of the interface elements and the bearing associated with the points of interest corresponding to the at least two interface elements, and store the data in the neighbor list in response to identifying both the horizontal overlap and the vertical overlap.

BRIEF DESCRIPTION OF THE DRAWINGS

Figure 1:
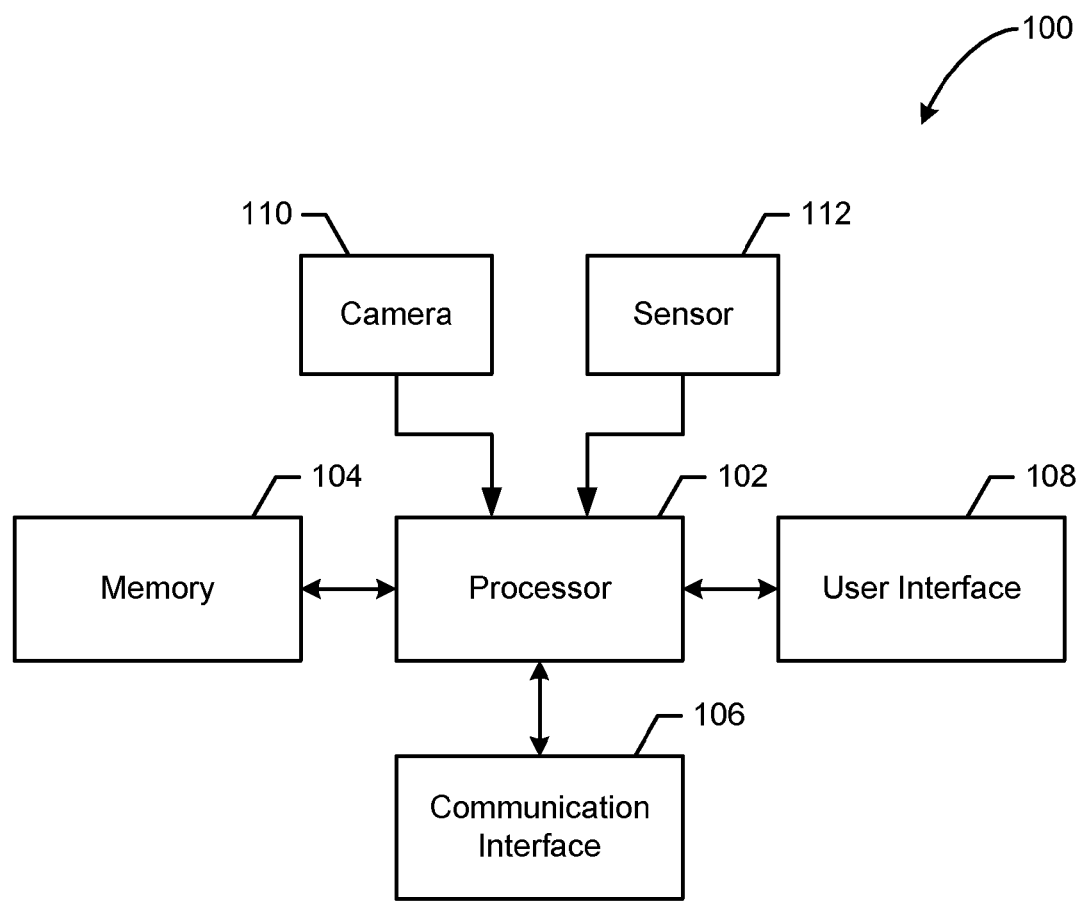
Figure 2:
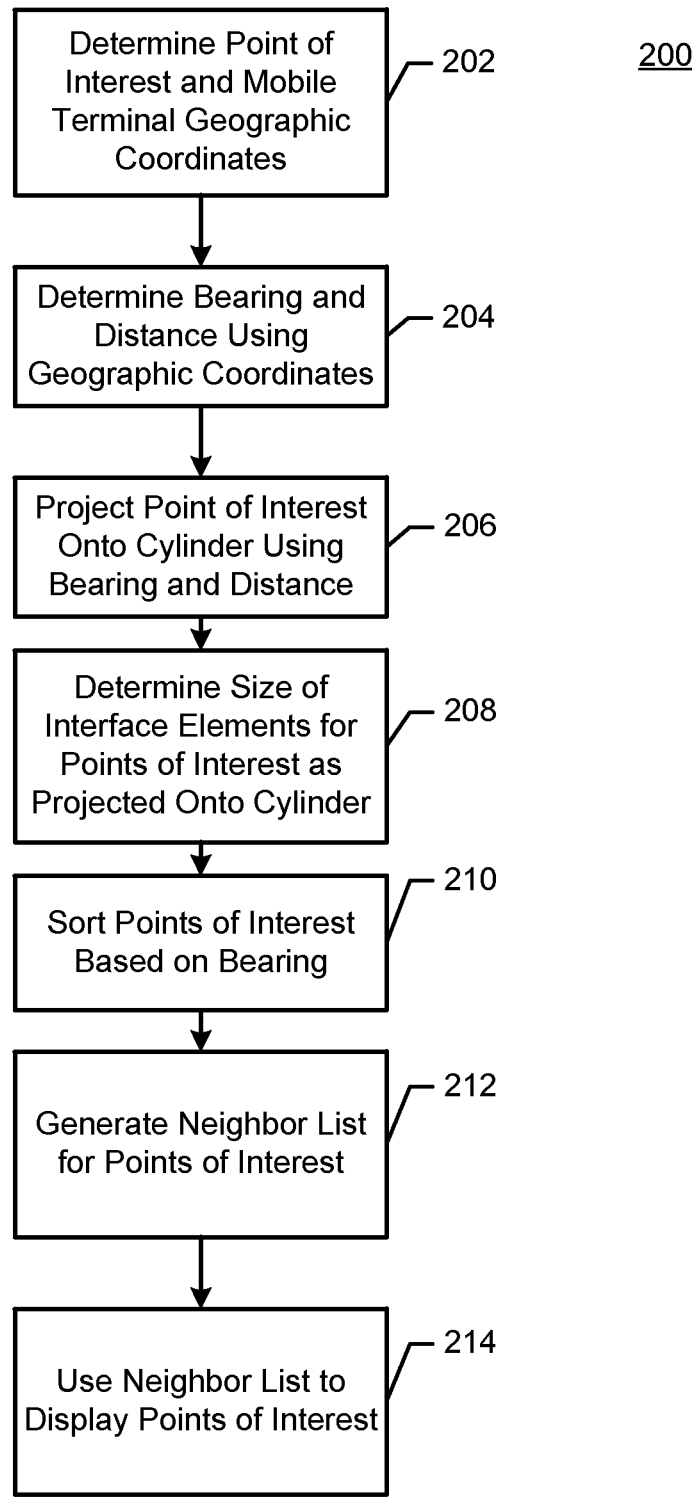
Figure 3:
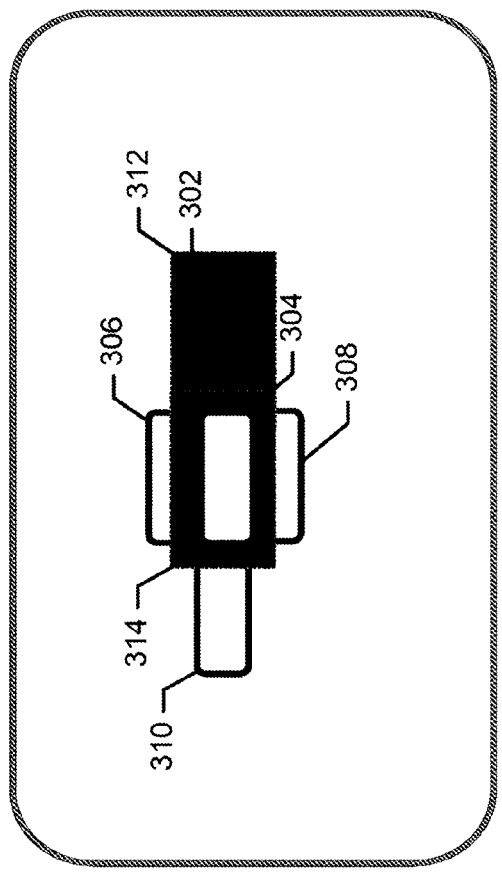
Figure 4:
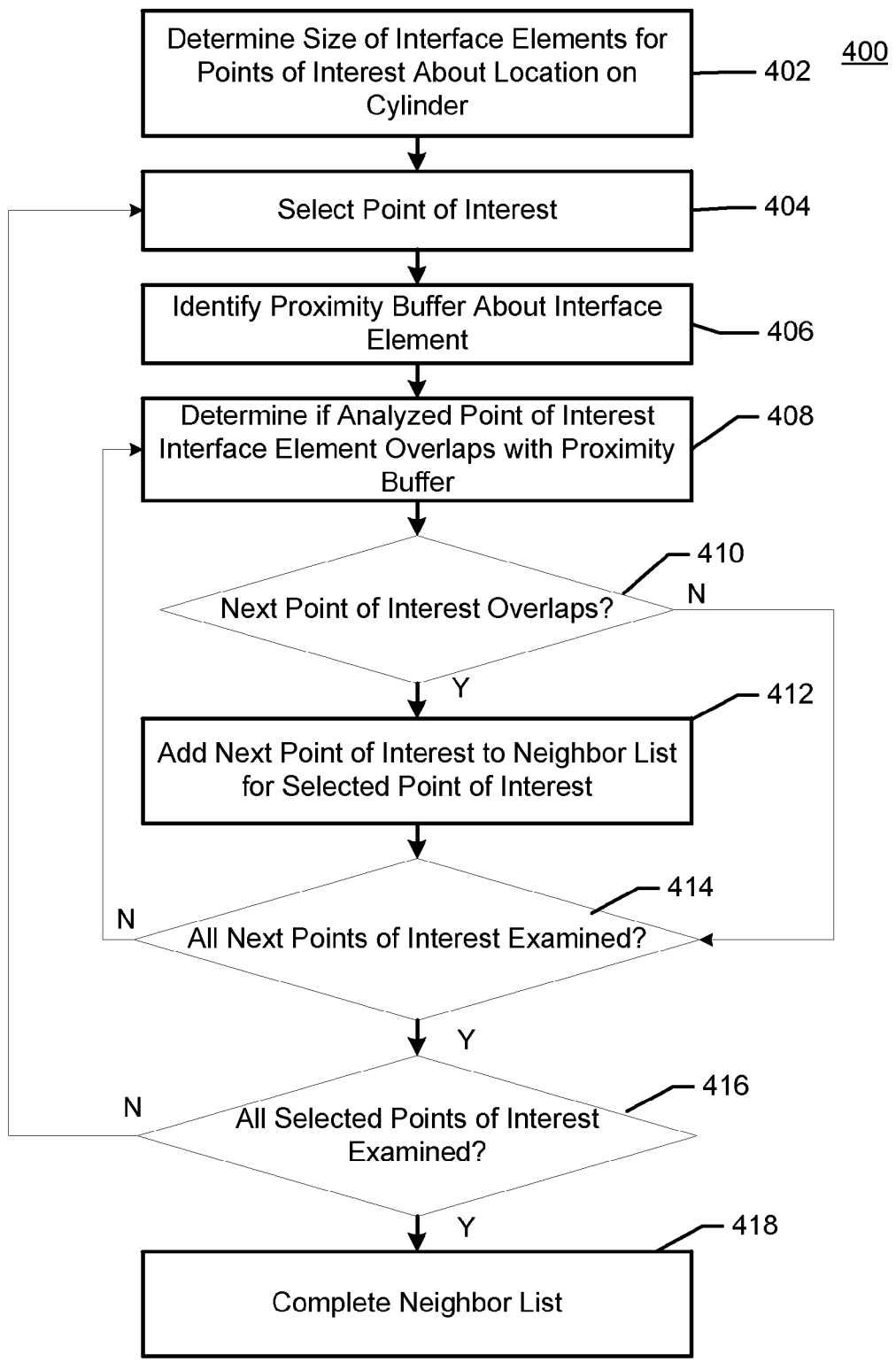
Figure 5:
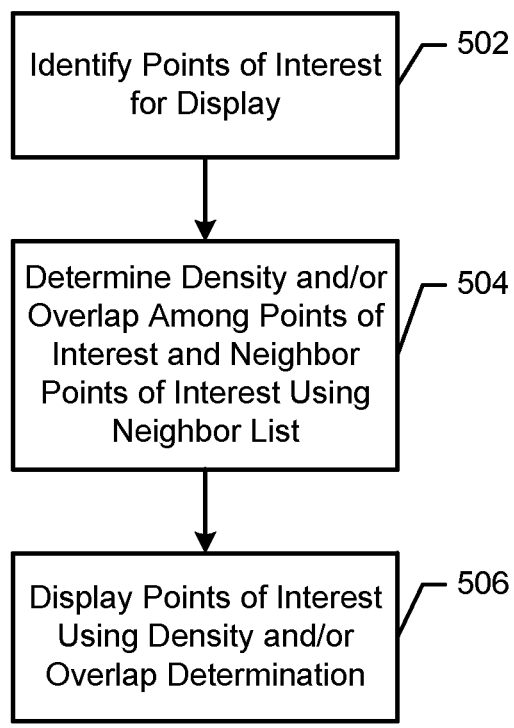

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a flow diagram depicting an example of a method for placing an interface element in an AR interface in accordance with an example embodiment of the present invention;

FIG. 3 is a schematic diagram depicting an example of a display for presenting one or more interface elements associated with points of interest in accordance with example embodiments of the present invention;

FIG. 4 is a flow diagram depicting an example of a method for identifying overlapping points of interest in accordance with an example embodiment of the present invention; and FIG. 5 is a flow diagram depicting an example of a method for using a neighbor list to display interface elements associated with points of interest in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment of the present invention in order to display an AR interface on a display device, such as a display device coupled to a mobile terminal. In this regard, a method, apparatus and computer program product of an example embodiment may preprocess one or more interface elements to estimate locations of the interface elements on a display. The data generated by the preprocessing may be used to identify overlapping interface elements and to optimize clustering of interface elements.

The points of interest may be projected onto a cylinder that represents a space around a mobile terminal. The cylindrical projection may be employed to identify the location of each point of interest in a three dimensional coordinate space. The area of the three dimensional representation that is displayed via the display device may correspond to a physical position and/or orientation of the mobile terminal in space. In some of the embodiments, the overlaid image may be generated by receiving data over a network. The received data may correspond to a particular physical location of the mobile terminal, a particular query initiated by a user of the mobile terminal, or any other relevant data capable of being displayed as part of an AR interface.

The system of an embodiment of the present invention may include an apparatus 100 as generally described below in conjunction with FIG. 1 for performing one or more of the operations set forth by FIGS. 2-5 and also described below. In this regard, the apparatus 100 may be embodied by a mobile terminal. In this embodiment, the mobile terminal may be in communication with a display and/or a data network, either directly, such as via a wireless or wireline connection, or indirectly via one or more intermediate computing devices. In this regard, the display and the mobile terminal may be parts of the same system in some embodiments. However, the apparatus 100 may alternatively be embodied by another computing device that is in communication with the display and the mobile terminal, such as via a wireless connection, a wireline connection or the like. For example, the apparatus may be a mobile telephone, a personal digital assistant (PDA), a pager, a laptop computer, a tablet computer or any of numerous other hand held or portable communication devices, computation devices, content generation devices, content consumption devices or combinations thereof.

It should also be noted that while FIG. 1 illustrates one example of a configuration of an apparatus 100 for generating an AR interface, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, the apparatus 100 for displaying points of interest in an AR interface in accordance with one example embodiment may include or otherwise be in communication with one or more of a processor 102, a memory 104, a communication interface 106, a user interface 108, a camera 110 and a sensor 112. In some embodiments, the processor (and/or co-processors or any other processing circuitry assisting or otherwise associated with the processor) may be in communication with the memory device via a bus for passing information among components of the apparatus. The memory device may include, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory device 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 106 may be any means such as a device or circuitry embodied in either hardware or a combination of hardware and software that is configured to receive and/or transmit data from/to a network and/or any other device or module in communication with the apparatus 100, such as by supporting communications with a display and/or a mobile terminal. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The apparatus 100 may include a user interface 108 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. In one embodiment, the display of the apparatus may be embodied by a liquid crystal display (LCD) screen presented on one surface of the mobile terminal. For example, in an instance in which the display is an LCD screen embodied on one surface of the mobile terminal, the AR interface may be displayed on the screen for viewing by and interacting with the user of the mobile terminal. As the mobile terminal moves in physical space and visual input provided to the mobile terminal changes, the AR interface displayed on the screen may be updated in a corresponding manner. The processor 102 may comprise user interface circuitry configured to control at least some functions of one or more user interface elements such as a display and, in some embodiments, a speaker, ringer, microphone and/or the like. The processor 102 and/or user interface circuitry comprising the processor 102 may be configured to control one or more functions of one or more user interface elements through computer program instructions (e.g., software and/or firmware) stored on a memory accessible to the processor (e.g., memory 104, and/or the like).

In some example embodiments, the apparatus 100 may include an image capturing element, such as a camera 110, video and/or audio module, in communication with the processor 102. The image capturing element may be any means for capturing an image, video and/or audio for storage, display or transmission. For example, in an example embodiment in which the image capturing element is a camera, the camera may include a digital camera capable of forming a digital image file from a captured image. As such, the camera may include all hardware (for example, a lens or other optical component(s), image sensor, image signal processor, and/or the like) and software necessary for creating a digital image file from a captured image. Alternatively, the camera may include only the hardware needed to view an image, while a memory device 104 of the apparatus stores instructions for execution by the processor in the form of software necessary to create a digital image file from a captured image. In an example embodiment, the camera 110 may further include a processing element such as a co-processor which assists the processor in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

As shown in FIG. 1, the apparatus 100 may also include one or more sensors 112, such as a location information receiver (e.g., a GPS receiver), an accelerometer, a gyroscope, a compass, or the like, that may be in communication with the processor 102 and may be configured to determine the location of the apparatus and to detect changes in motion and/or orientation of the apparatus.

The method, apparatus 100 and computer program product may now be described in conjunction with the operations illustrated in FIGS. 2-5. In this regard, the apparatus may include means, such as the processor 102, the camera 110 or the like, for displaying points of interest in an AR interface. The processor 102 may perform use point of interest (POI) data in conjunction with input from one or more of the sensors 112 to display points of interest via a display in an efficient and visually pleasing manner. The processor 102 may process the locations of one or more of the points of interest to optimize placement of the POIs, such as by projecting the points of interest onto a cylinder, and deriving three dimensional coordinates based on the position of the POIs on the cylinder. The processor 102 may further identify interface elements for POIs that are likely to be proximate to one another in the three dimensional representation. Identification of these POIs may allow for clustering and deoverlapping processes prior to actual rendering of the POIs, thus improving the user visual experience while also reducing the amount of processor resources consumed.

FIG. 2 is a flow diagram depicting an example of a method 200 for placing an interface element in an AR interface in accordance with an example embodiment of the present invention. The method 200 is operable to create an efficient and aesthetically pleasing user interface to receive information about one or more points of interest in an AR environment. The method 200 may determine the location of points of interest as they would be displayed in the AR environment, and arrange and/or cluster the interface elements to ensure that the interface elements are efficiently presented to a user. The method 200 may further construct a neighbor list data structure to identify POIs that are proximate to one another prior to actual rendering of the POIs. The neighbor list may be used to identify POIs that may be close to one another so that the close POIs may be clustered and/or deoverlapped prior to rendering. The method 200 may be performed by a mobile terminal, such as the apparatus 100, or by a processing means, such as the processor 102.

Points of interest are typically associated with geographic coordinates to provide a common location reference system. For example, a POI may be identified as being at a particular set of latitude and longitude coordinates and/or elevation data, or at a particular location defined by a polar coordinate system. At action 202, geographic coordinates may be identified for one or more points of interest to be displayed in an AR interface. For example, an application executing on the mobile terminal may receive sensor data (e.g., global positioning system data) to identify the location of the mobile terminal. The mobile terminal may determine one or more points of interest proximate to the location of the mobile terminal. For example, the mobile terminal may query a POI database using the identified location of the mobile terminal, and the POI database may provide one or more points of interest proximate to the location. Points of interest may also be associated with metadata, indicating other attributes of the POI. For example, points of interest may be associated with a name, an address, a phone number, and/or a type of POI. In some embodiments, the mobile terminal may request a particular category or type of points of interest (e.g., restaurants or shops) proximate to the current location, and the AR interface may be designed to display points of interest of the chosen category or type. The geographic coordinates may be determined by a processing means, such as the processor 102.

In order to display a POI in the AR interface, the mobile terminal may determine the location of the POI relative to the current position of the mobile terminal. This location may be determined at action 204, and expressed as polar coordinates with a bearing and distance value. In this regard, the geographic coordinates may be processed along with the geographic location of the mobile terminal in order to convert the geographic coordinates to positions in a three dimensional space relative to the mobile terminal. For example, a location expressed in polar coordinates may be converted to a location relative to the mobile terminal, or the relative coordinates of the POI may be converted into a distance and bearing relative to the location and bearing of the mobile terminal. For example, a conversion function may utilize conversion properties as specified by the World Geodetic System 84 (WGS84) standard coordinate frame. The location of each POI relative to the mobile terminal may be performed by a processing means, such as the processor 102. The WGS84 standard coordinate frame may provide the basis for a conversion function provided as part of an application programming interface (API). The conversion function may be performed according to the following equations:

$$\Delta X_m = (\lambda_s - \lambda_f) \quad \text{(Eq. 1)}$$

$$\Delta Z_m = (\rho_s - \rho_f) \quad \text{(Eq. 2)}$$

Where $\Delta X_m$ is the difference between the latitude of the mobile terminal, $\lambda_s$, and the latitude of the POI, $\lambda_f$, in meters, and $\Delta Z_m$ is the difference between the longitude of the mobile terminal, $\rho_s$, and the longitude of the POI, $\rho_f$, in meters.

Once coordinates are established for the POI, the POI may be projected onto a cylinder representing the three dimensional space around the mobile terminal at action 206. The cylinder may be a unit cylinder, and each of the nearby points of interest may be projected onto the unit cylinder according to the distance and bearing of the POI relative to the mobile terminal as determined at action 202. For example, each POI may be associated with a bearing, $\Theta_A$, and a distance, $D_{fs}$, such as derived by the following equation:

$$\Theta_A = \Theta_A = \tan^{-1}\left(\frac{\Delta X_m}{\Delta Z_m}\right) \quad \text{(Eq. 3)}$$

where $\Delta X_m$ and $\Delta Z_m$ are the distance between the POI and the location of the mobile terminal along the North/South and East/West axes, respectively, and where $\Theta_A$ is an bearing with reference to North. The distance $D_{fs}$ may be derived by determining the actual distance in meters between the location of the POI and the location of the mobile terminal in meters. The points of interest may be projected onto the circle that forms the base of the cylinder using the bearing angle to define an angle relative to north on the circle, and the height of the POI on the cylinder may correspond to the distance $D_{fs}$. The POI may be projected onto the cylindrical representation via a processing means, such as the processor 102.

At action 208, the method 200 may determine the size of points of interest projected onto the cylinder. Each POI may be associated with a particular point in space, represented on the cylinder by a bearing (e.g., an angle relative to north) and a cylinder height. However, the POI is displayed as an interface element with a width and height, rather than as a point in space. As such, in order to determine which POIs are likely to be proximate to one another, the size of the interface element is determined. The size of the interface element may be related to a base interface element size multiplied by a scale value. For example, POIs that are closer to the mobile terminal may be scaled to appear larger in the display than POIs that are further away. Depending upon the distance, a given POI interface element may have different rules applied for determining the size of the interface element. For example, an interface element for a POI in the far distance may be represented by a small "scent" icon rather than a full-sized interface element. If the distance of the POI to the mobile terminal is included in the cylindrical projection as a height on the cylinder, then the size of the interface element for the POI may also be a function of this height. The size of the points of interest may be determined by a processing means, such as the processor 102.

The size of the POI may be determined based on how many screen pixels in width and height the scaled POI is. By determining the angle for the frame of view of the screen, a number of degrees of width and height may be determined for the interface element. For example, if the POI is half the width of a 800×480 screen (e.g., 400 pixels wide), and the angle of the frame of view of the screen is 90 degrees, then the POI would be 45 degrees wide. Alternately, the number of degrees of the display may be used with the pixel values of the screen to determine a number of degrees per pixel, and the number of degrees per pixel may be multiplied by the number of pixels in the POI interface element to arrive at the POI width and height in degrees. By determining the width and height of the POI interface element in degrees, proximate POIs that are likely to interfere with one another may be identified using the cylindrical representation, without the need to render the POI in three dimensional space.

At action 210, the POIs may be sorted based on their bearing relative to the circular base of the cylinder (e.g., a number of degrees with respect to north). The POIs may be sorted in this manner to simplify proximity detection and reduce the number of inefficient searches that are performed. For example sorting the POIs allows for horizontal comparisons with only the left and right neighbors. In the event there is no horizontal overlap, then there is no need to search for overlap with the next nearest neighbor to that side. The POIs may be sorted based on bearing by a processing means, such as the processor 102.

At action 212, a neighbor list may be generated for each of the POIs. As described above, the neighbor list may be utilized to identify potentially overlapping POIs without the need to render the POI in a three dimensional space. The neighbor list may be generated via a processing means, such as the processor 102. A method for generating the neighbor list is described further below with respect to FIG. 4.

At action 214, the neighbor list is used to display the POIs. As described above, the POIs may be displayed as interface elements in an AR interface. The neighbor list may be used to optimize the display of these interface elements prior to converting each interface element into a three dimensional format. In this manner, operations that are dependent upon interface element proximity, such as deoverlapping and/or clustering, may be performed prior to generating a three dimensional representation of each interface element. The neighbor list may be used to optimize display of the POIs as interface elements by a processing means, such as the processor 102.

FIG. 3 is a schematic diagram depicting an example of a display 300 for presenting one or more interface elements associated with points of interest in accordance with example embodiments of the present invention. The display 300 depicts five interface elements 302, 304, 306, 308, and 310.

The interface elements may be associated with POIs for an AR interface. When POIs are clustered together as shown by the interface elements 302, 304, 306, 308, and 310, it may be appropriate to deoverlap elements by introducing an offset value to the horizontal or vertical position of each interface element, or to cluster the interface elements together as a single interface element. In order to efficiently perform these operations, it may be appropriate to generate a neighbor list for the set of interface elements so that appropriate action may be taken prior to rendering the interface elements in a three dimensional environment.

During a nearest neighbor analysis, it may be appropriate to examine not just the interface element itself, but also an area around the interface element. By including a buffer zone around the actual edge of the interface element, it may be possible to anticipate and avoid scenarios where interface elements are moved to deoverlap with a first interface element, but the movement results in an overlap with a second interface element. In the present example, two buffer zones 312 and 314 are shown for two interface elements 302 and 304, respectively. Each of the interface elements may be analyzed in turn to generate a neighbor list. In the present example, a resulting neighbor list (accounting for an buffer zone for each interface element equivalent to the buffer zones 312 and 314 for interface elements 302 and 304) might appear as follows:

TABLE 1

| POI | Neighbors |
|---|---|
| 302 | 304, 306, 308 |
| 304 | 302, 306, 308, 310 |
| 306 | 302, 304, 310 |
| 308 | 302, 304, 310 |
| 310 | 304, 306, 308 |

The neighbor list may be used to preemptively adjust the positioning, spacing, or clustering of the interface elements before the interface elements are converted to a three dimensional representation. A method 400 for generating the neighbor list is described further below with respect to FIG. 4.

FIG. 4 is a flow diagram depicting an example of a method 400 for identifying overlapping points of interest in accordance with an example embodiment of the present invention. As described above, POIs that are projected onto a cylindrical representation may be analyzed to identify other proximate points of interest. POIs that are likely to cause an overlap in interface elements may be identified and stored in a neighbor list data structure to control the display of the interface elements in an efficient and visually pleasing manner. The method may be performed by a mobile terminal, such as the apparatus 100, and/or by a processing means, such as the processor 102.

At action 402, a size may be determined for one or more interface elements associated with points of interest projected about a cylinder. As described with respect to FIG. 2, each point of interest may be associated with a point location and an interface element drawn about the point location. The size of the interface element defines how far out from the actual location of the POI that the POI may represent a proximity concern. The size of the interface element may be provided in terms of a number of degrees about the circle that defines the base of the cylinder. In some embodiments, POIs are sorted for analysis based on the bearing of each POI about the circle, as described above with respect to FIG. 2. A size may be determined for the interface elements by a processing means, such as the processor 102.

At action 404, a POI may be selected for analysis. The POI may be selected in the sort order defined by the bearing around the circle of the base of the cylinder, such that POIs are analyzed in order of their location on the circle relative to due north. Analysis of the POIs in this manner may allow for efficient determination of potentially overlapping POIs ignoring POIs to the left and right of the selected POI where the selected POI does not have horizontal overlap with a nearest left and right neighbor (e.g., ignoring POIs further to the right if the POI does not have a horizontal overlap with its nearest right neighbor). Selection of the POI may be performed by a processing means, such as the processor 102.

At action 406, a proximity buffer may be identified about the interface element. As described with respect to FIG. 3, each interface element may have a buffer region defined about the boundaries of the interface element for the purposes of determining whether a POI is proximate to another POI. This buffer allows for accounting of potential movement and error in the predicted location of the interface element when the interface element is drawn in three dimensional space. For example, a particular interface element may be moved horizontally or vertically as part of a deoverlapping operation, and thus this potential movement may be accounted for by the proximity buffer. In some embodiments, the size of the proximity buffer may be based upon a maximum distance employed in an overlapping operation. The proximity buffer may be identified about the interface element by a processing means, such as the processor 102.

At action 408, the method 400 determines whether an interface element for a next point of interest overlaps with the proximity buffer. The determination of whether the interface element overlaps may be performed by examining a range of degree values about the POI location as defined by the interface element size. For example, a point of interest may be located at 45 degrees about a cylindrical circle, and have a proximity buffer width of 10 degrees. As such, the horizontal range of the point of point of interest may be 45 degrees plus or minus 5 degrees, thus giving a range of 40-50 degrees for potential horizontal overlap. Therefore, any POI with an interface element that overlaps in the range of 40-50 degrees may be defined as a proximate neighbor to the selected POI. A similar calculation may be performed to identify vertical overlap, with a degree range defined for a POI proximity buffer height compared against a vertical degree range for a POI that has been established as horizontally overlapping. In circumstances where the proximity buffer of the selected POI and an analyzed POI overlap in both the horizontal and vertical directions, the analyzed POI may be identified as a neighbor to the analyzed POI. If the analyzed POI does not overlap in both directions, then the analyzed POI may not be identified as a neighbor to the selected POI. The determination as to whether the analyzed POI overlaps with the proximity buffer may be performed by a processing means, such as the processor 102.

At action 410, the method 400 branches depending upon whether the analyzed POI overlaps with the proximity buffer. If there is overlap, the method 400 proceeds to action 412. Otherwise, the method 400 proceeds to action 414. The process flow of the method at action 410 may be determined by a processing means, such as the processor 102.

At action 412, the analyzed POI is added to the neighbor list of the selected POI because the analyzed POI is within a proximity range of the selected POI. The neighbor list does not guarantee that the analyzed POI and the selected POI will overlap. Differences in coordinate systems between the cylindrical representation and a three dimensional representation may cause the neighbor list to be an approximation of which POI interface elements are most likely to overlap one another. The neighbor list provides an efficient way to perform interface operations on interface elements prior to projecting the interface elements into a three dimensional space. The analyzed POI may be added to the neighbor list by a processing means, such as the processor 102.

At action 414, if all POIs have been analyzed for overlap with the selected POI proximity buffer, then the method 400 may proceed to action 416. Otherwise, the method 400 may examine the next unanalyzed POI by returning to action 408. In some embodiments, if the POIs are sorted by bearing relative to the circle that forms the base of the cylinder and the analyzed POI does not overlap with the selected POI in a horizontal direction, then no further POIs in that direction may be analyzed to avoid redundant processing. The method 400 may then analyze a next POI in the opposite direction (e.g., counter-clockwise if the next clockwise POI does not have a horizontal overlap), or select another POI if both directions have been analyzed. This continued analysis process of examining each POI for overlap with the proximity cell may be performed by a processing means, such as the processor 102.

At action 416, the method 400 branches depending upon whether all POIs have been selected for analysis. If all POIs have been analyzed for proximity with other POIs, then the method 400 proceeds to action 418 to complete the neighbor list. Otherwise, the method returns to action 404 to select a new POI for proximity analysis. The process of selecting a next POI for analysis may be performed by a processing means, such as the processor 102.

At action 418, the neighbor list may be completed using the information derived by examining the POIs for proximity with one another. The neighbor list may be stored in a memory of a mobile terminal, such as the apparatus 100, to assist the mobile terminal with display of the POIs, and the associated interface elements, in an efficient manner. Completion of the neighbor list may include committing the neighbor list to storage, or notifying another process that the neighbor list is complete and ready for use. Various other ancillary data may also be added to the neighbor list to facilitate display of the interface elements. An example of a method for using the neighbor list in this manner is described below with respect to FIG. 5.

FIG. 5 is a flow diagram depicting an example of a method 500 for using a neighbor list to display interface elements associated with points of interest in accordance with an example embodiment of the present invention. Once generated, the neighbor list may be used as an approximation of the likelihood that POIs will overlap when projected into a three dimensional space. This neighbor list may thus be used before rendering the three dimensional environment to cluster or move POI interface elements to ensure a clear, uncluttered, visually pleasing display. The method 500 may be performed by a mobile terminal, such as the apparatus 100, or a processing means, such as the processor 102, to achieve these objectives.

At action 502, one or more POIs are identified for display. For example, a mobile terminal may receive a particular heading, define a particular view port (e.g., a video display) and wish to display every POI visible at that heading and in that view port. In some circumstances (e.g., large cities with many POIs), this may result in a display that shows more POI interface elements than a user may easily interact with. As such, prior to rendering the POIs, the subset that are to be displayed in the video display may be analyzed using the neighbor list. The POIs may be identified for display by a processing means, such as the processor 102.

At action 504, the method 500 accesses neighbor data for the displayed points of interest in the neighbor list. If two or more POIs are indicated as neighbors in the list and both are identified for display at action 502, then it may be appropriate to perform interface operations to reduce clutter and improve the device interface. For example, two or more POIs that are likely to overlap and located at the same bearing relative to the mobile terminal may be combined into a single interface element via clustering techniques. Alternately, if two or more POIs are identified as neighbors and there are gaps to either side of the interface elements of those POIs, then it may be appropriate to introduce a horizontal offset so that the interface elements do not occlude one another. As a yet further alternative, if two or more POIs are identified as neighbors and there are gaps above and below the interface elements of those POIs, then it may be appropriate to introduce a vertical offset so that the interface elements do not occlude one another. In some embodiments, the neighbor list is used to identify POIs that should be checked for overlap or occlusion after plotting the POIs in a three dimensional environment, as the neighbor list may only be an approximation of the positioning of the POIs and thus verification may be necessary. The neighbor data for the identified POIs may be accessed and processed by a processing means, such as the processor 102.

POI interface elements may be configured to overlap in three dimensional space in such a manner so that POI names or titles are always displayed. An "always-visible" area may be defined for each POI interface element. For example, interface elements may have a particular text area (e.g., the name of the POI) identified as always-visible. The always-visible area of the POI may be defined based on a starting (x, y) coordinate and vertical and horizontal offsets from the starting coordinate. If portions of the always-visible area of the instant POI are occluded, then the occluding POI or the instant POI may be relocated such that the always-visible area is visible in the display. In some embodiments, the always-visible area of the POI may be used as the proximity buffer for the POI during establishment of the neighbor list (e.g., via the method 400).

POI interface elements may be presented as a cluster when they share the same geolocation or if there is a visual vertical or horizontal overlap that falls above a certain overlap threshold. Selecting a cluster of POI interface elements may expand the cluster, and performing a selection operation elsewhere may close the cluster.

At action 506, display of the identified POIs is performed using the information determined from the neighbor list at action 504. Display of the identified POIs may be performed by a processing means, such as the processor 102. In this manner, the neighbor list may allow for efficient display of POIs and analysis of POI density and overlap information prior to building a three dimensional representation of the POI interface elements, thus saving processing power while ensuring efficient display of a visually pleasing interface.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   projecting, using a processor, a plurality of points of interest onto a cylinder using at least a bearing angle for each point of interest;
   determining an angular width of each of a plurality of interface elements, each of the plurality of interface elements associated with at least one of the points of interest;
   identifying at least one horizontal overlap between at least two of the plurality of interface elements using the angular width of the interface elements and the bearing angle associated with the points of interest corresponding to the at least two interface elements;
   in response to identifying the at least one horizontal overlap, storing data in a neighbor list, the data indicating that the points of interest corresponding to the at least two interface elements are neighbors; and
   modifying, based on the neighbor list, a display of a subset of the plurality of points of interest, where the subset of the plurality of points of interest includes at least one of the points of interest corresponding to the at least two interface elements.

2. The method of claim 1, wherein the display is modified by deoverlapping the at least two interface elements.

3. The method of claim 1, wherein the display is modified by clustering the at least two interface elements into a single interface element.

4. The method of claim 1, further comprising:
   determining an angular height of each of the plurality of interface elements;
   identifying at least one vertical overlap between the at least two of the plurality of interface elements using the angular height of the interface elements and the bearing associated with the points of interest corresponding to the at least two interface elements; and
   only storing the data in the neighbor list in response to identifying both the horizontal overlap and the vertical overlap.

5. The method of claim 1, further comprising:
   sorting the plurality of points of interest based on the bearing of each point of interest relative to north; and,
   identifying the at least two of the plurality of the interface elements based on the sorting of the plurality of points of interest.

6. The method of claim 1, further comprising determining whether a horizontal overlap exists for interface elements corresponding to each of the plurality of points of interest; and,
   storing data indicating each of the horizontal overlaps in the neighbor list.

7. The method of claim 1, further comprising using the neighbor list to identify a subset of points of interest to analyze for overlapping interface elements.

8. The method of claim 1, further comprising:
   determining a first location, the first location corresponding to the location of a mobile terminal;
   receiving at least one second location, the at least one second location corresponding to the location of at least one of the points of interest; and
   determining the bearing angle using the first location and the second location.

9. An apparatus comprising at least one processor and at least one memory including computer program instructions, the at least one memory and the computer program instructions configured to, with the at least one processor, cause the apparatus at least to:
   project a plurality of points of interest onto a cylinder using at least a bearing angle for each point of interest;
   determine an angular width of each of a plurality of interface elements, each of the plurality of interface elements associated with at least one of the points of interest;
   identify at least one horizontal overlap between at least two of the plurality of interface elements using the angular width of the interface elements and the bearing angle associated with the points of interest corresponding to the at least two interface elements;
   in response to identifying the at least one horizontal overlap, store data in a neighbor list, the data indicating that the points of interest corresponding to the at least two interface elements are neighbors; and modify, based on the neighbor list, a display of a subset of the plurality of points of interest, where the subset of the plurality of points of interest includes at least one of the points of interest corresponding to the at least two interface elements.

10. The apparatus of claim 9, wherein the display is modified by deoverlapping the at least two interface elements.

11. The apparatus of claim 9, wherein the display is modified by clustering the at least two interface elements into a single interface element.

12. The apparatus of claim 9, further configured to:
determine an angular height of each of the plurality of interface elements;
identify at least one vertical overlap between the at least two of the plurality of interface elements using the angular height of the interface elements and the bearing associated with the points of interest corresponding to the at least two interface elements; and
store the data in the neighbor list in response to identifying both the horizontal overlap and the vertical overlap.

13. The apparatus of claim 9, further configured to:
sort the plurality of points of interest based on the bearing of each point of interest relative to north; and,
identify the at least two of the plurality of the interface elements based on the sorting of the plurality of points of interest.

14. The apparatus of claim 9 of claim 1, further configured to determine whether a horizontal overlap exists for interface elements corresponding to each of the plurality of points of interest; and,
store data indicating each of the horizontal overlaps in the neighbor list.

15. The apparatus of claim 9, further configured to use the neighbor list to identify a subset of points of interest to analyze for overlapping interface elements.

16. The apparatus of claim 9, further configured to:
determine a heading of the apparatus; and
determine, using the heading, whether the point of interest is visible in a display of the apparatus prior to displaying the point of interest.

17. A computer program product comprising at least one non-transitory computer-readable storage medium bearing computer program instructions embodied therein for use with a computer, the computer program instructions comprising program instructions configured to:
project a plurality of points of interest onto a cylinder using at least a bearing angle for each point of interest;
determine an angular width of each of a plurality of interface elements, each of the plurality of interface elements associated with at least one of the points of interest;
identify at least one horizontal overlap between at least two of the plurality of interface elements using the angular width of the interface elements and the bearing angle associated with the points of interest corresponding to the at least two interface elements;
in response to identifying the at least one horizontal overlap, store data in a neighbor list, the data indicating that the points of interest corresponding to the at least two interface elements are neighbors; and
modify, based on the neighbor list, a display of a subset of the plurality of points of interest, where the subset of the plurality of points of interest includes at least one of the points of interest corresponding to the at least two interface elements.

18. The computer program product of claim 17, wherein the display is modified by deoverlapping the at least two interface elements.

19. The computer program product of claim 17, wherein the display is modified by clustering the at least two interface elements into a single interface element.

20. The computer program product of claim 17, further comprising program instructions to:
determine an angular height of each of the plurality of interface elements;
identify at least one vertical overlap between the at least two of the plurality of interface elements using the angular height of the interface elements and the bearing associated with the points of interest corresponding to the at least two interface elements; and
store the data in the neighbor list in response to identifying both the horizontal overlap and the vertical overlap.

* * * * *